United States Patent
Taku et al.

(10) Patent No.: US 10,792,597 B2
(45) Date of Patent: Oct. 6, 2020

(54) SUCTION STRAINER

(71) Applicant: YAMASHIN-FILTER CORP., Kanagawa (JP)

(72) Inventors: Meiho Taku, Kanagawa (JP); Makoto Ishizuka, Kanagawa (JP); Tatsuhiro Oshita, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 0 days.

(21) Appl. No.: 15/842,977

(22) Filed: Dec. 15, 2017

(65) Prior Publication Data

US 2018/0104628 A1 Apr. 19, 2018

Related U.S. Application Data

(63) Continuation of application No. PCT/JP2016/067539, filed on Jun. 13, 2016.

(30) Foreign Application Priority Data

Jun. 18, 2015 (JP) ................................. 2015-123226

(51) Int. Cl.
*B01D 36/00* (2006.01)
*B01D 35/02* (2006.01)
(Continued)

(52) U.S. Cl.
CPC ........... *B01D 36/001* (2013.01); *B01D 19/00* (2013.01); *B01D 24/00* (2013.01); *B01D 29/00* (2013.01);
(Continued)

(58) Field of Classification Search
CPC .. B01D 19/00; B01D 36/001; B01D 2201/12; B01D 2201/64; B01D 24/00;
(Continued)

(56) References Cited

U.S. PATENT DOCUMENTS 4,783,271 A * 11/1988 Silverwater ............ B01D 29/15
210/149
2005/0211619 A1 9/2005 Bortnik et al.
(Continued)

FOREIGN PATENT DOCUMENTS

JP S63-97702 U 6/1988
JP S63-160908 U 10/1988
(Continued)

OTHER PUBLICATIONS

International Search Report issued in International Application No. PCT/JP2016/067539 dated Sep. 13, 2016 and English translation (5 pages).
(Continued)

*Primary Examiner* — Terry K Cecil
(74) *Attorney, Agent, or Firm* — Nakanishi IP Associates, LLC

(57) ABSTRACT

A tank for storing oil includes a suction strainer with first and second filtration portions. The first filtration portion has a substantially cylindrical shape and formed by bending a thin plate into a pleated shape. The second filtration portion is provided on the outer side of the first filtration portion. The second filtration portion has a substantially cylindrical shape and is formed of a material having a plurality of spaces formed in a surface and interior of the material.

15 Claims, 10 Drawing Sheets

(51) Int. Cl.

| | | |
|---|---|---|
| *B01D 29/00* | (2006.01) | |
| *B01D 29/07* | (2006.01) | |
| *B01D 24/00* | (2006.01) | |
| *F15B 11/00* | (2006.01) | |
| *F15B 21/04* | (2019.01) | |
| *B01D 19/00* | (2006.01) | |
| *F02M 37/50* | (2019.01) | |
| *F02M 37/54* | (2019.01) | |
| *B01D 35/027* | (2006.01) | |
| *B01D 29/33* | (2006.01) | |
| *B01D 29/58* | (2006.01) | |
| *B01D 35/00* | (2006.01) | |
| *B01D 39/12* | (2006.01) | |
| *B01D 39/20* | (2006.01) | |

(52) U.S. Cl.
CPC .......... *B01D 29/07* (2013.01); *B01D 29/333* (2013.01); *B01D 29/58* (2013.01); *B01D 35/005* (2013.01); *B01D 35/02* (2013.01); *B01D 35/027* (2013.01); *B01D 39/12* (2013.01); *B01D 39/2041* (2013.01); *F02M 37/50* (2019.01); *F02M 37/54* (2019.01); *F15B 11/00* (2013.01); *F15B 21/04* (2013.01); *B01D 2201/12* (2013.01); *B01D 2201/184* (2013.01); *B01D 2201/188* (2013.01); *B01D 2201/64* (2013.01)

(58) Field of Classification Search
CPC ...... B01D 29/00; B01D 29/07; B01D 29/333; B01D 29/58; B01D 35/005; B01D 35/02; B01D 39/12; B01D 39/2041; B01D 35/027; B01D 2201/184; B01D 2201/188; F15B 11/00; F15B 21/04; F02M 37/50; F02M 37/54

See application file for complete search history.

(56) References Cited

U.S. PATENT DOCUMENTS

| 2011/0198280 | A1* | 8/2011 | Jones ................. B01D 39/2024 |
| | | | 210/489 |
| 2011/0259838 | A1 | 10/2011 | Bernards et al. |
| 2013/0248436 | A1 | 9/2013 | Hacker |
| 2014/0034580 | A1* | 2/2014 | Chen ...................... C10G 31/09 |
| | | | 210/708 |
| 2014/0238923 | A1* | 8/2014 | Miyasaka .............. B01D 35/02 |
| | | | 210/241 |

FOREIGN PATENT DOCUMENTS

| JP | S63-296765 A | 12/1988 |
| JP | 2004-11873 A | 1/2004 |
| JP | 2006-204988 A | 8/2006 |
| JP | 2011-152540 A | 8/2011 |
| JP | 2011-218252 A | 11/2011 |
| WO | 2011/127479 A1 | 10/2011 |
| WO | 2014-132356 A1 | 9/2014 |

OTHER PUBLICATIONS

Written Opinion of International Searching Authority issued in PCT/JP2016/067539 dated Sep. 13, 2016 (5 pages).
Extended European Search Report issued in a counterpart European Patent Application No. 16811591.3 dated May 30, 2018 (7 pages).
Written Opinion of International Searching Authority issued in PCT/JP2016/067539 dated Sep. 13, 2016, with English Translation (13 pages).
Office Action issued in Chinese Patent Application No. 201680031362.4 dated Aug. 5, 2019, with English Translation (14 pages).
Office Action issued in Japanese Patent Application No. 2015-123226 dated Jun. 25, 2019, with English Translation (10 pages).
Office Action issued in Japanese Patent Application No. 2015-123226 dated Oct. 23, 2019, with English Translation (6 pages).
Office Action dated Apr. 17, 2020 and supplemental search report dated Apr. 13, 2020, issued in Chinese Patent Application No. 201680031362.4, with English Translation (18 pages).

* cited by examiner

SUCTION STRAINER

CROSS-REFERENCE TO RELATED APPLICATIONS

The present application is a continuation application of International Patent Application No. PCT/JP2016/067539 filed on Jun. 13, 2016, which claims priority to Japanese Patent Application No. 2015-123226 filed on Jun. 18, 2015, the entire contents of which are incorporated by reference.

TECHNICAL FIELD

The present invention relates to a suction strainer.

BACKGROUND ART

Patent Document 1 discloses a liquid tank that houses a liquid after passing through a bubble removing device. This liquid tank includes a discharge port that discharges bubbles removed by the bubble removing device, and a discharge position retaining means for continually, with respect to a fluctuating liquid surface level, discharging the bubbles from the discharge port into the liquid and in the vicinity of the liquid surface. As a result, bubbles that float upward in hydraulic oil are not drawn into a strainer.

CITATION LIST

Patent Document

Patent Document 1: JP 2004-11873 A

Nevertheless, in the invention described in Patent Document 1, the problem arises that the bubble removing device needs to be separately provided outside the liquid tank. Further, in the invention described in Patent Document 1, fine bubbles that cannot be removed by the bubble removing device and bubbles produced when the liquid passes through a filter provided in the tank may be drawn from the strainer and sent out.

In light of the above, an object of the present invention to provide a suction strainer capable of removing bubbles.

SUMMARY OF INVENTION

A suction strainer according to one or more embodiments of the present invention is, for example, provided in a tank configured to store oil. Such a suction strainer includes a first filtration portion having a substantially cylindrical shape and formed by bending a thin plate into a pleated shape, and a second filtration portion having a substantially cylindrical shape and provided to an outer side of the first filtration portion. The second filtration portion is formed of a material having a plurality of spaces formed in a surface and interior of the material.

According to the suction strainer of one or more embodiments of the present invention, on the outer side of the first filtration portion having a substantially cylindrical shape and formed by bending a thin plate into a pleated shape, the second filtration portion having a substantially cylindrical shape and formed of a material having a plurality of spaces formed in a surface and interior of the material is provided. As a result, bubbles included in the oil are captured by the plurality of spaces formed in the surface and interior of the second filtration portion and are caused to grow, making it possible to remove the bubbles from the oil.

Here, the suction strainer may further include a first plate configured to cover entire upper end surfaces of the first filtration portion and the second filtration portion, and a float provided to the first plate. The float may be movable between a first position where the float closes a first hole formed in the first plate and a second position where the float opens the first hole. As a result, in a case that the suction strainer is provided in the tank, air accumulated on a lower side of the first plate can be removed from the first hole. Further, the float may be moved to the first position when a pressure inside the suction strainer is lower than a predetermined value.

Here, the suction strainer may further include an outer tube portion configured to cover an outer peripheral surface of the second filtration portion. The outer tube portion may have no hole formed in a first region in a vicinity of an upper end of the outer tube portion and have holes formed in an entire surface of a second region other than the first region of the outer tube portion. As a result, even in a case that the tank is tilted and an area in the vicinity of the upper end of the outer tube is exposed to air, it is possible to prevent the air from being drawn into the strainer.

Here, the first plate may include a second hole that is formed between a first portion that comes into contact with the first filtration portion and a second portion that comes into contact with the second filtration portion and is larger than a hole formed in the first filtration portion. As a result, air accumulated in the space between the first filtration portion and the second filtration portion can be released outside the strainer.

According to one or more embodiments of the present invention, bubbles can be removed.

DESCRIPTION OF EMBODIMENTS

Below, detailed description of embodiments of the present invention will be given with reference to the drawings.

First Embodiment

Figure 1:
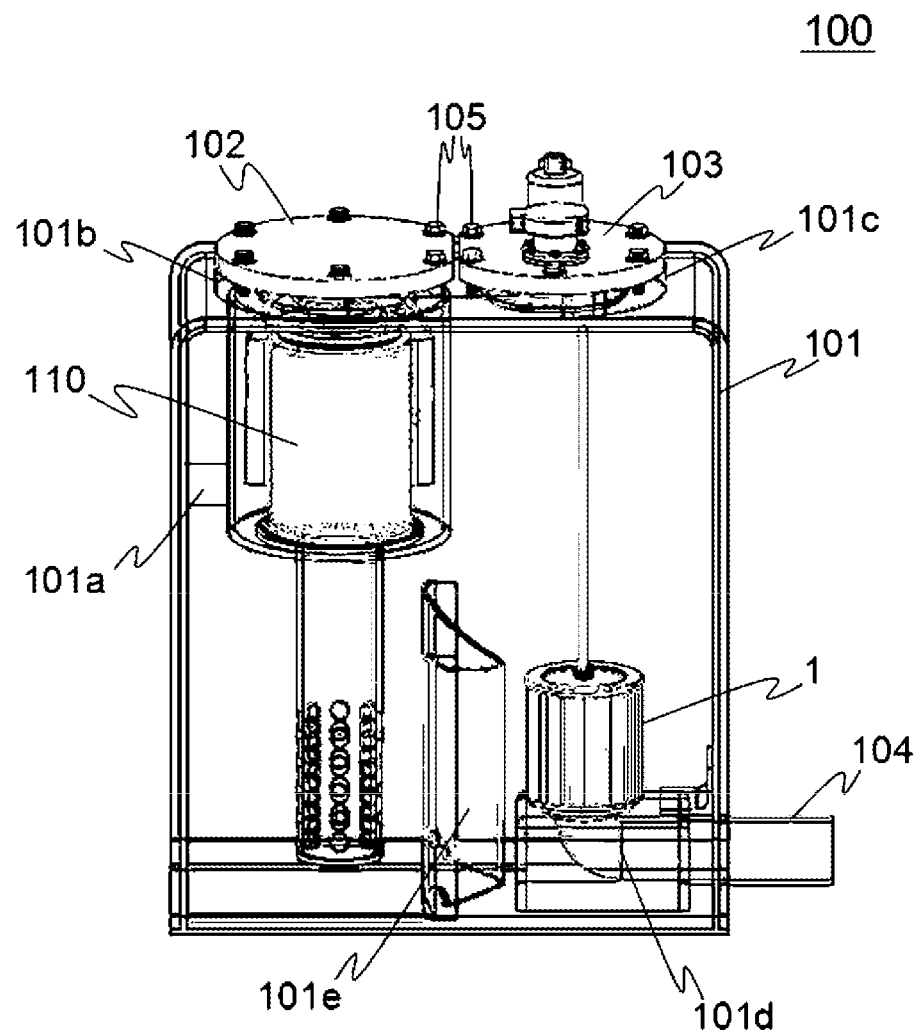
FIG. 1 is a diagram illustrating an overview of a hydraulic oil tank 100 provided therein with a suction strainer 1 according to an embodiment of the present invention.

FIG. 1 is a diagram illustrating an overview of a hydraulic oil tank 100 provided therein with a suction strainer 1 according to an embodiment of the present invention. In FIG. 1, main parts of the hydraulic oil tank 100 are illustrated from a perspective view.

The hydraulic oil tank 100 is installed in a work machine (a hydraulic apparatus, for example, not illustrated), and is disposed inside a hydraulic circuit of hydraulic oil supplied to the hydraulic apparatus and is configured to store the hydraulic oil. The hydraulic oil tank 100 includes a tank main body 101 having a box shape, for example, and this tank main body 101 has a hollow interior. The tank main body 101 primarily includes the suction strainer 1 and a return filter 110.

In the hydraulic circuit, the hydraulic oil passes through the hydraulic apparatus and is introduced into the hydraulic oil tank 100.

An inflow port 101a configured to allow the hydraulic oil to flow into the tank main body 101 is formed on a side surface of the tank main body 101. The hydraulic oil that has entered through the inflow port 101a is introduced into the return filter 110. The hydraulic oil is filtered by the return filter 110 and is stored in the hydraulic oil tank 100.

Further, openings 101b, 101c used for maintenance of the suction strainer 1, the return filter 110, and the like are formed at an upper end portion of the tank main body 101. A lid 102 is attached to the opening 101b, and a lid 103 is attached to the opening 101c.

Bolt insertion holes are formed in peripheral edge portions of the lids 102, 103. Bolts 105 inserted through the bolt insertion holes are screwed into bolt holes (not illustrated) of the tank main body 101, thereby tightening the lids 102, 103 to the tank main body 101.

An outflow port 101d that allows the hydraulic oil inside the tank main body 101 to flow out to a hydraulic pump (not illustrated) is formed in a vicinity of a lower end portion of the tank main body 101 (on a side surface of the tank main body 101 near a bottom surface in the present embodiment). A suction pipe 104 that leads to a suction port of the hydraulic pump (not illustrated) is fitted into the outflow port 101d from an outer side of the tank main body 101.

To prevent foreign matter from entering the suction pipe 104, the suction strainer 1 is provided on an upper side of the outflow port 101d (inner side of the tank main body 101). The hydraulic oil stored in the hydraulic oil tank 100 is suctioned into the hydraulic pump (not illustrated), flows out to the suction pipe 104 via the suction strainer 1, and is supplied once again to the hydraulic apparatus.

Note that the outflow port 101d is not limited to the position illustrated in FIG. 1 as long as the position is in the vicinity of the lower end portion of the tank main body 101. For example, the outflow port 101d may be formed on a bottom surface of the tank main body 101.

A partition plate 101e that defines a space where the suction strainer 1 is provided and a space where the return filter 10 is provided is provided to the bottom surface of the tank main body 101. Note that the partition plate 101e is not necessarily required.

Figure 2:
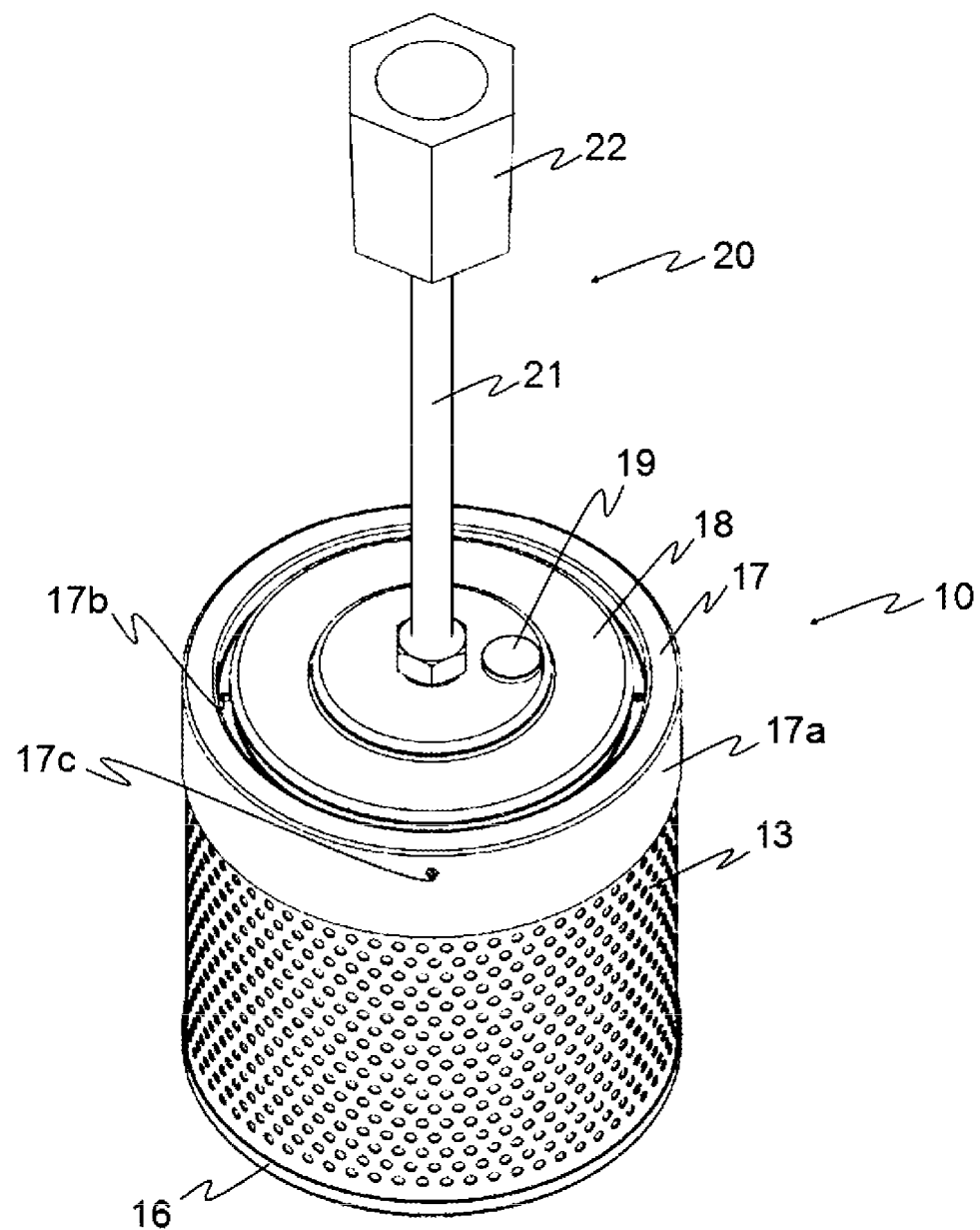
FIG. 2 is a perspective view illustrating an overview of the suction strainer 1.
Figure 3:
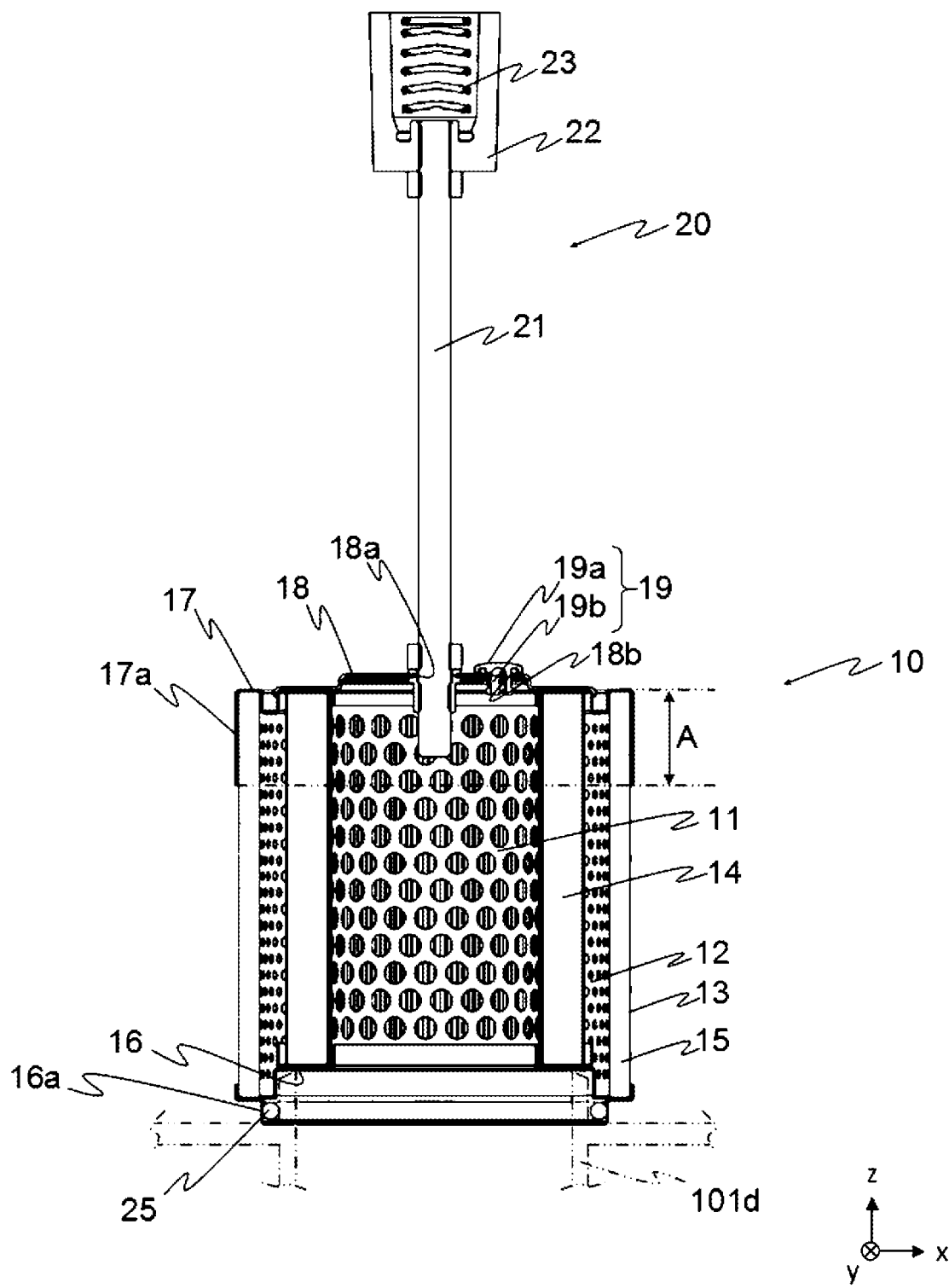
FIG. 3 is a cross-sectional view illustrating an overview of the suction strainer 1.

FIG. 2 is a perspective view illustrating an overview of the suction strainer 1. Further, FIG. 3 is a cross-sectional view illustrating an overview of the suction strainer 1 (note that hatching indicating a cross section is omitted). The suction strainer 1 primarily includes a strainer portion 10, and a rod portion 20 connected to the strainer portion 10.

The strainer portion 10 is a member having a substantially cylindrical shape, and is provided on the outflow port 101d (refer to FIG. 3).

As illustrated in FIG. 3, the strainer portion 10 primarily includes an inner tube 11, a middle tube 12, an outer tube 13, a first filtration portion 14, a second filtration portion 15, plates 16, 17, 18, and a float 19.

The inner tube 11, the middle tube 12, and the outer tube 10 are members that have a substantially hollow cylindrical shape and include openings at both ends. The inner tube 11, the middle tube 12, and the outer tube 13 are formed from a material (stainless steel, for example) having high corrosion resistance. Note that the inner tube 11, the middle tube 12, and the outer tube 13 may be formed of resin.

Holes through which a hydraulic oil passes are formed substantially in an entire region of the inner tube 11, the middle tube 12, and the outer tube 13. In the present embodiment, the hydraulic oil flows from an outer side toward an inner side of the strainer portion 10, and thus a size (7 mm, for example) and pitch (10 mm, for example) of the holes formed in the inner tube 11 are greater than or equal to a size (3 mm, for example) and pitch (6 mm, for example) of the holes formed in the middle tube 12 and the outer tube 13, respectively.

Note that the size of the holes formed in the inner tube 11 need not be greater than or equal to the size of the holes formed in the middle tube 12 and the outer tube 13. However, to improve the flow of the hydraulic oil, it is suitable that the holes formed in the inner tube 11 be made larger and an aperture ratio of the inner tube 11 be correspondingly higher.

A diameter of the inner tube 11 is less than a diameter of the middle tube 12, and the inner tube 11 is housed in the middle tube 12. The diameter of the middle tube 12 is less than a diameter of the outer tube 13, and the middle tube 12 is housed in the outer tube 13.

The first filtration portion 14 is provided on an outer side of the inner tube 11. The first filtration portion 14 has a substantially cylindrical shape and a thickness in a radial direction. A height of the first filtration portion 14 is substantially the same as a height of the inner tube 11.

Figure 4:
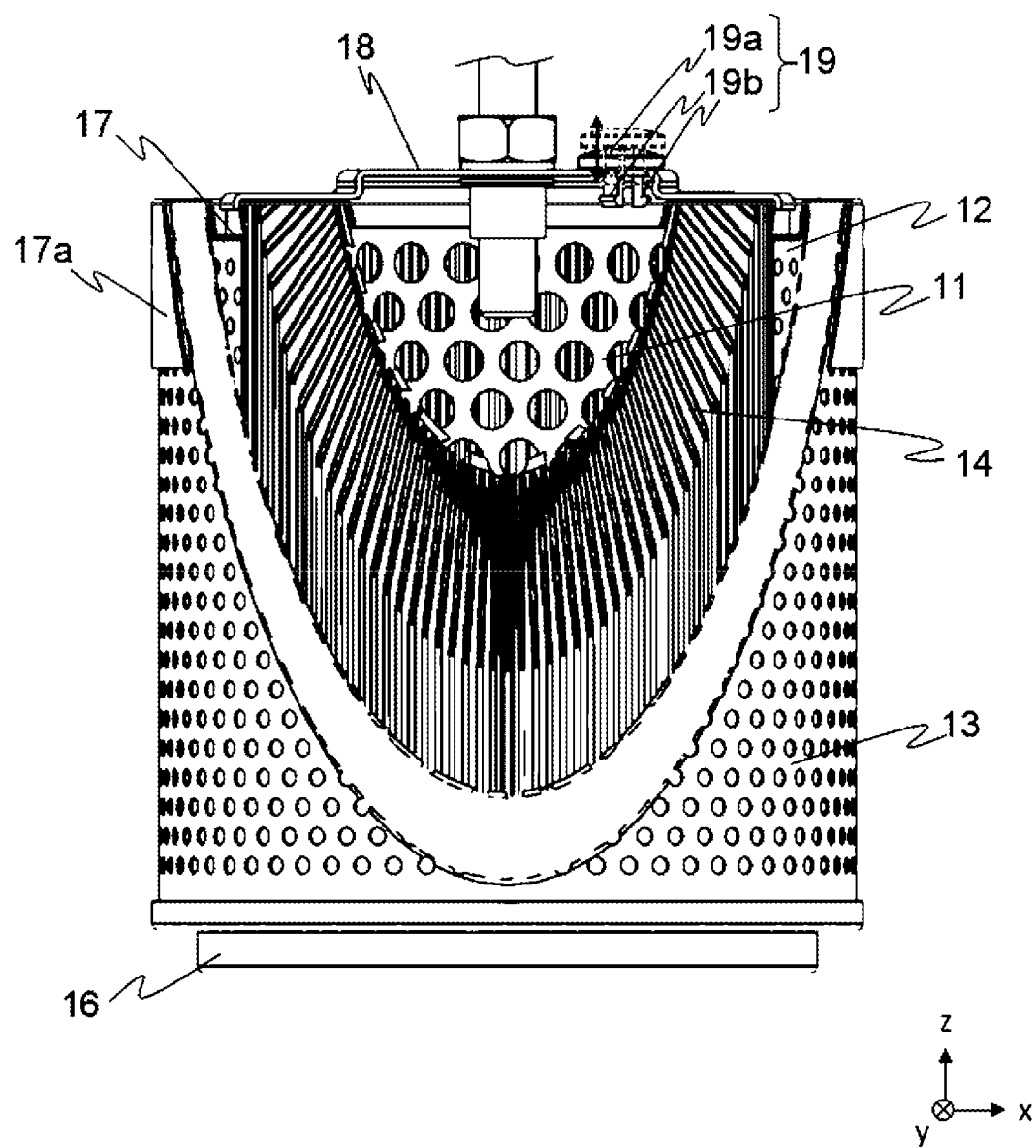
FIG. 4 is a partial cross-sectional view illustrating the details of a strainer portion 10.

FIG. 4 is a partial cross-sectional view illustrating the details of the strainer portion 10 (note that hatching indicating a cross section is omitted). The first filtration portion 14 is formed by pleating a sheet-like thin plate having holes formed in substantially the entire region thereof, and connecting both ends of the pleated thin plate to form a cylindrical shape. As a result, the first filtration portion 14 is formed into a substantially cylindrical pleated shape. Note that while the first filtration portion 14 is formed of a wire mesh. The wire mesh is made of a fine-meshed metal (stainless steel, for example) formed of thin wires woven into a mesh in the present embodiment, a filter paper made of a synthetic resin, paper, or the like may be used. The first filtration portion 14 is configured to filter hydraulic oil.

The description will now return to FIG. 3. The middle tube 12 is a member having a diameter greater than the diameter of an outer periphery of the first filtration portion 14. In the present embodiment, a space is formed between the first filtration portion 14 and the middle tube 12. This space serves as a space which the hydraulic oil and air after passing through the outer tube and the second filtration portion 15 enter. Air entering into the space accumulates in the vicinity of the upper end of the space and is subsequently discharged from an air hole 17b (refer to FIG. 2).

The second filtration portion 15 is provided between the middle tube 12 and the outer tube 13. In other words, the second filtration portion 15 is held by the middle tube 12 and the outer tube 13. The second filtration portion 15 has a substantially cylindrical shape and a thickness in the radial direction. A height of the second filtration portion 15 is substantially the same as a height of the middle tube 12 and the outer tube 13.

The second filtration portion 15 is formed by bundling steel wool obtained by processing an iron (stainless steel, for example) into fine, long fibers to form a substantially cylindrical shape. The second filtration portion 15 has a plurality of spaces formed in a surface and interior thereof. This configuration causes the second filtration portion 15 to be soft and elastic.

Note that while the second filtration portion 15 is formed of steel wool in the present embodiment, the second filtration portion 15 is not limited to this configuration. As long as a plurality of spaces are formed in the surface and the interior, the second filtration portion 15 may be formed of a sintered metal, a sponge, or a foamed resin, for example. Further, the second filtration portion 15 may be formed by bundling a wire material obtained by processing metal other than iron into fine, long fibers to form a substantially cylindrical shape.

The plate 16 is provided to first ends of the inner tube 11, the middle tube 12, the outer tube 13, and the like, and the plate 17 is provided to second ends. The plate 16 and the plate 17 are members having a substantially circular plate shape or a bottomed substantially cylindrical shape, and are formed of resin or metal.

The plate 16 and the plate 17 are provided so as to cover ends (openings) of the inner tube 11, the middle tube 12, the outer tube 13, the first filtration portion 14, and the second filtration portion 15. In other words, the plate 16 and the plate 17 sandwich the inner tube 11, the middle tube 12, the outer tube 13, the first filtration portion 14, and the second filtration portion 15.

A fitting portion 16a having a cylindrical shape and externally fitted to the outflow port told is formed on the plate 16. A sealing member 25 provided to an inner peripheral surface of the fitting portion 16a prevents the hydraulic oil from entering the strainer portion 10 from between the plate 16 and the outflow port 101d.

The plate 17 includes an outer peripheral portion 17a having a cylindrical shape. The outer peripheral portion 17a covers the vicinity of the upper end (the end on the +z side) of the outer tube 13. No hole is formed in the outer peripheral portion 17a. As a result, holes formed in a region (region A in FIG. 3) covered by the outer peripheral portion 17a are covered by the outer peripheral portion 17a.

Further, as illustrated in FIG. 2, an air hole 17b is formed in the plate 17 between a portion that comes into contact with the first filtration portion 14 and a second portion that comes into contact with the second filtration portion 15. The air hole 17b is a hole for discharging, outside the strainer portion 10, the air accumulated in the vicinity of the upper end of the space formed between the first filtration portion 14 and the middle tube 12. The size of the air hole 17b is greater than the size of the hole of the first filtration portion 14. Further, the size of the air hole 17b is substantially the same size as the size of the holes formed in the outer tube 13. Note that the thickness of the space formed (the distance in the radial direction) between the first filtration portion 14 and the middle tube 12 is preferably greater than or substantially equal to the thickness of the second filtration portion 15.

Further, similar to the air hole 17b, a plurality of (about two to four) air holes 17c for removing air are formed in the outer peripheral portion 17a. However, the air holes 17c are not necessarily required.

The description will now return to FIG. 3. The plate 18 is provided to the plate 17. The plate 17 and the plate 18 are integrated with each other by welding or the like. The plate 18 is a member having a substantially circular plate shape, and is formed of resin or metal. A hole 18a is formed in a center portion of the plate 18, and a rod 21 is fixed to the plate 18 via the hole 18a.

Further, the float 19 is provided to the plate 18. The float 19 is formed of a material (metal or resin) having a density greater than or substantially equal to the density of the hydraulic oil. The float 19 includes a main body portion 19a that covers a hole 18b formed in the plate 18, and a stopper 19b for locking the float to the hole 18b. As illustrated in FIG. 4, the float 19 is provided movable in a vertical direction (z direction) between a position (refer to the solid line in FIG. 4) where the hole 18b is closed and a position (refer to the dashed line in FIG. 4) where the hole 18b is open.

Note that while the plate 17 and the plate 18, which are separate components, are integrated with each other in the present embodiment, the plate 17 and the plate 18 may be a single plate.

Further, while the inner tube 11 is provided on the inner side of the first filtration portion 14 in FIGS. 2 to 4, neither the inner tube 11 nor the outer tube 13 is not necessarily required.

The description will now return to FIG. 3. The rod portion 20 primarily includes the rod 21 and an attaching portion 22. The rod 21 is disposed extending upward from the strainer portion 10. The attaching portion 22 attached to an attaching portion (not illustrated) formed on a back surface of the lid 103 is provided to an upper end portion of the rod 21.

A spring 23 (refer to FIG. 3) is provided in the attaching portion 22 in a fully compressed state. With the suction strainer 1 provided in the tank main body 101, the spring 23 biases the rod 21, that is, the strainer portion 10 downward (in the −z direction).

The suction strainer 1 can be pulled out from the tank main body 101 during maintenance or the like by removing the lid 103 from the tank main body 101 and pulling the upper end portion of the rod 21.

Next, the functionality of the suction strainer 1 thus configured will be described. First, the suction strainer 1 is attached to the tank main body 101 storing the hydraulic oil. With the rod 21 held so that the attaching portion 22 is positioned above (in the +z direction), the suction strainer 1 is pushed downward (in the −z direction).

The upper end of the strainer portion 10 is covered by the plate 17 and the plate 18, and therefore, in a case that the suction strainer 1 is attached to the interior of the tank main body 101, air accumulates on the inner side of the inner tube 11, that is, the lower side of the plate 18. The float 19 moves in the +z direction by compression force of the air accumulated on the lower side of the plate 18, the hole 18b is opened, and the air accumulated on the lower side of the plate 18 is released outside the tank main body 101 from the interior of the strainer portion 10. As a result, the suction strainer 1 is set in the tank main body 101, enabling the functionality of the suction strainer 1.

In a case that the hydraulic oil stored in the tank main body 101 is suctioned into the hydraulic pump (not illustrated), the hydraulic oil is drawn from the outer side of the outer tube 13 into the strainer portion 10 of the suction strainer 1.

The holes in the region A in the vicinity of the upper end of the outer tube 13 are covered by the outer peripheral portion 17a. Thus, even in a case that the hydraulic oil tank 100 is tilted and an area in the vicinity of the upper end of the outer tube 13 is exposed to air, it is possible to prevent the air from being drawn into the strainer portion 10.

Note that while the air holes 17c are formed in the outer peripheral portion 17a, the size of the air hole 17c is suitably less than or equal to the size of the holes formed in the entire surface of the outer tube to prevent the air from being drawn into the strainer portion 10.

In a case that the hydraulic oil is drawn from the outer side of the outer tube 13 into the strainer portion 10, the bubbles contained in the hydraulic oil are drawn into the strainer portion 10 along with the hydraulic oil.

The hydraulic oil after passing through the holes formed in the outer tube 13 passes through the second filtration portion 15, from the outer side to the inner side. With the plurality of fine spaces formed in the surface and interior of the second filtration portion 15, the bubbles contained in the hydraulic oil are captured in the spaces in the surface and the interior of the second filtration portion 15. As a result, the bubbles become larger in the spaces in the surface and the interior of the second filtration portion 15, and the large bubbles rise upward (in the +z direction) away from the second filtration portion 15.

The bubbles that have grown in the second filtration portion 15 are released from the outer side of the outer tube 13 into the tank main body 101. Further, the bubbles that have grown in the second filtration portion 15 are released into the space formed between the first filtration portion 14 and the middle tube 12 via the middle tube 12. The bubbles released into the space formed between the first filtration portion 14 and the middle tube 12 are released outside the strainer portion 10 via the air hole 17b.

The hydraulic oil from which the bubbles have been removed by the second filtration portion 15 passes through the space formed between the first filtration portion 14 and the middle tube 12, and flows into the inner tube 11 after removal of dust and the like by the first filtration portion 14. The oil that has flown into the inner tube 11 flows outside the strainer portion 10 from below.

In the present embodiment, the size and the pitch of the holes of the first filtration portion 14 are substantially from 40 to 50 µm (micrometers), and less than the size and the pitch (substantially from 100 to 110 µm) of a normally used filtration portion. This configuration makes it possible to decrease a flow rate of the hydraulic oil passing through the first filtration portion 14, that is, a flow rate of the hydraulic oil passing through the second filtration portion 15. As a result, the amount of time that the bubbles remain in the second filtration portion 15 is increased, allowing the bubbles to grow larger.

Note that, while the hydraulic oil is filtered and the bubbles are removed by the suction strainer 1, the downward force is applied to the float 19 by the suctioning force of the hydraulic pump (not illustrated). The gravity of the float 19 and the downward force that acts on the float 19 cause the main body portion 19a to cover the hole 18b, and thus hydraulic oil from which bubbles have not been removed no longer flows into the inner tube 11.

According to the present embodiment, the bubbles contained in the hydraulic oil can be removed when the hydraulic oil passes through the suction strainer 1. This makes it possible to prevent defects that occur as a result of air being suctioned into the pump. The bubbles may also be prevented from bursting inside the hydraulic circuit or the like, which causes the temperature and the pressure of the hydraulic oil to temporarily increase to a significant degree and, as a result, the occurrence of part damage and the like.

Note that while the outer peripheral portion 17a is integrated with the outer tube 13 to cover the holes formed in the region A of the outer tube 13 in order to prevent oil and air from flowing into the region A in the present embodiment, the configuration for preventing oil and air from flowing into the region A is not limited thereto. For example, holes may be formed in the entire surface of the region of the outer tube other than the region A without covering the outer tube 13 with the outer peripheral portion 17a or forming holes in the region A of the outer tube 13. Further, the outer peripheral portion 17a may be formed as a component of the outer tube 13 rather than a component of the plate 17.

Second Embodiment

While the float 19 is attached to the hole 18b to open and close the hole 18b in the first embodiment of the present invention, the configuration for opening and closing the hole 18b is not limited thereto.

In a second embodiment of the present invention, a configuration for opening and closing the hole 18b using a ball-type float is employed. Below, description is given of a suction strainer 2 according to the second embodiment. Note that the same components as those in the first embodiment are denoted by the same reference numerals, and descriptions thereof will be omitted.

Figure 5:
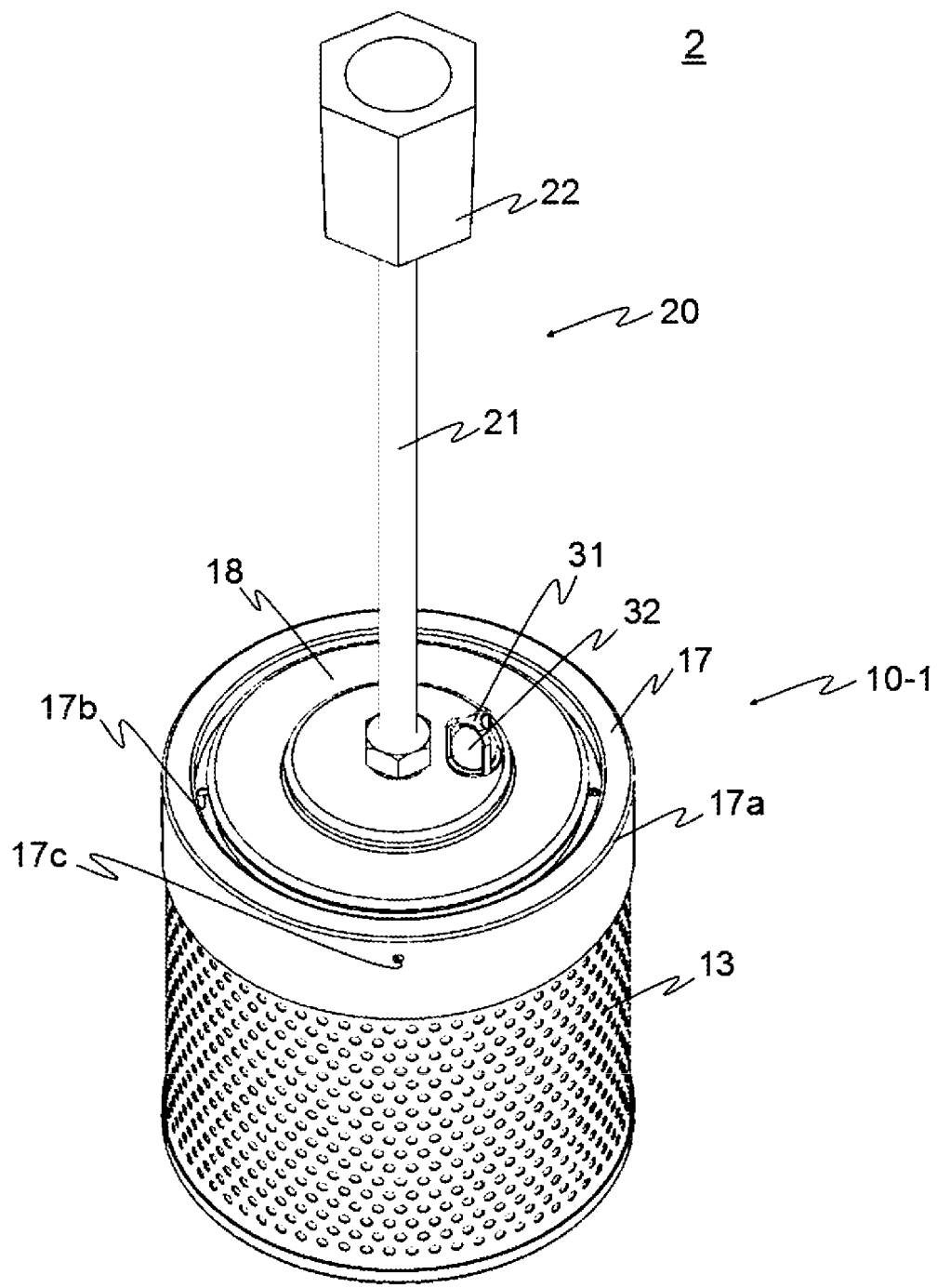
FIG. 5 is a perspective view illustrating an overview of a suction strainer 2.

FIG. 5 is a perspective view illustrating an overview of the suction strainer 2. The suction strainer 2 primarily includes a strainer portion 10-1, and the rod portion 20 connected to the strainer portion 10-1.

Figure 6:
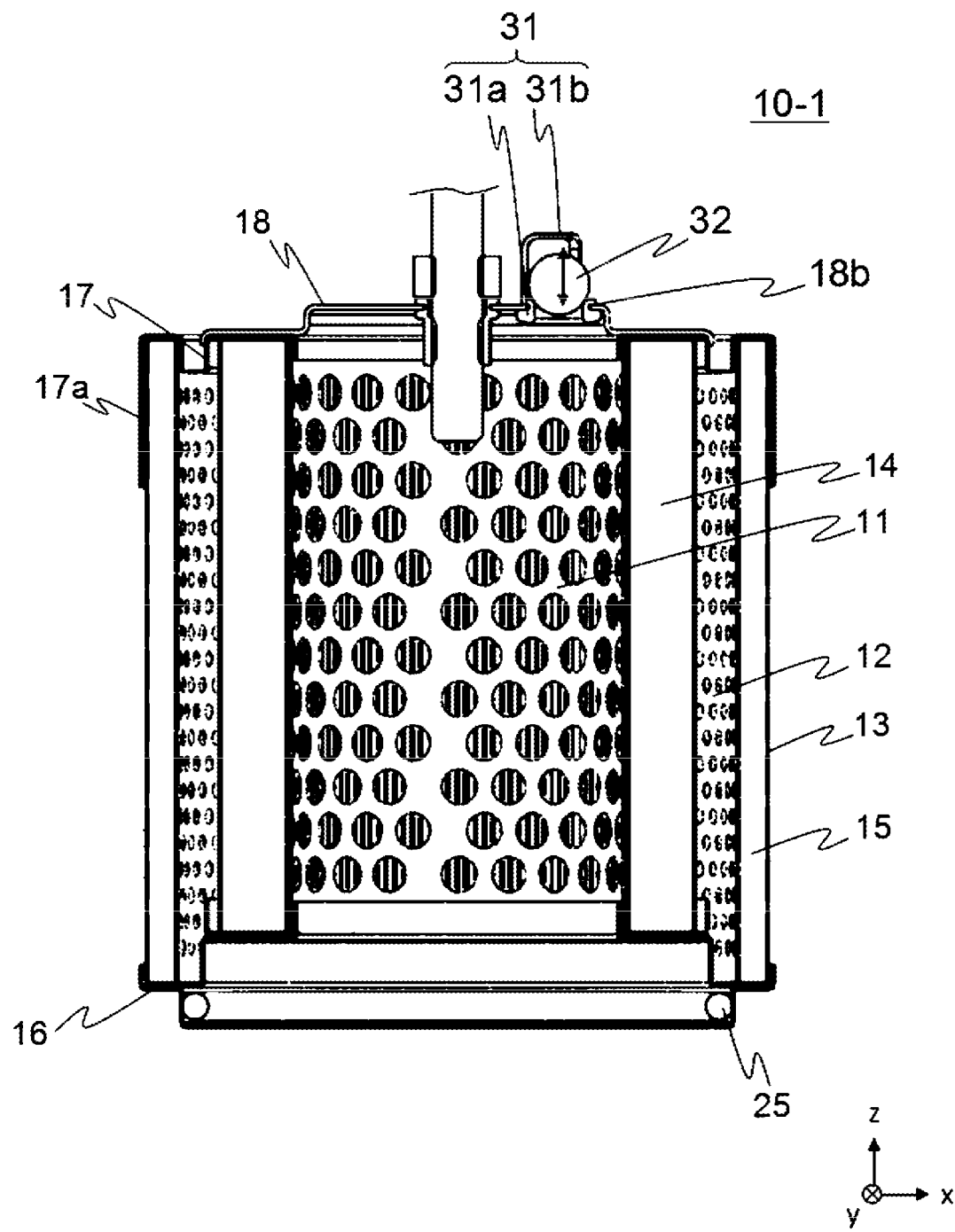
FIG. 6 is a cross-sectional view illustrating the details of a strainer portion 10-1.

FIG. 6 is a cross-sectional view illustrating the details of the strainer portion 10-1 (note that hatching indicating a cross section is omitted). The strainer portion 10-1 primarily includes the inner tube 11, the middle tube 12, the outer tube 13, the first filtration portion 14, the second filtration portion 15, the plates 16, 17, 18, a frame 31, and a float 32.

The frame 31 and the float 32 are formed of resin, for example. The frame 31 includes a base 31a inserted into the hole 18b, and an enclosing portion 31b that encloses the float 32. A diameter of the float 32 is greater than an inner diameter of the base 31a. A height (distance in the z direction) of the enclosing portion 31b is greater than the diameter of the float 32 so that the float 32 can move in the frame 31. The float 32 can be formed of a material (metal or resin) having a density greater than or substantially equal to the density of the hydraulic oil, similar to the material of the float 19.

Next, the action of the suction strainer 2 will be described. Of the action of the suction strainer 2, the same portions as those of the suction strainer 1 will be not be described below.

The upper end of the strainer portion 10 is covered by the plate 17 and the plate 18. Thus, in a case that the suction strainer 1 is attached to the interior of the tank main body 101, air accumulates on the inner side of the inner tube 11, that is, the lower side of the plate 18. In a case that the float 32 moves in the +z direction by the compression force of the air accumulated on the lower side of the plate 18, the hole 18b is opened, and the air accumulated on the lower side of the plate 18 is released outside the strainer portion 10.

In a case that the hydraulic oil stored in the tank main body 101 is suctioned into the hydraulic pump (not illustrated), a downward force is applied to the float 32 by the suctioning force of the hydraulic pump (not illustrated). The gravity of the float 32 and the downward force that acts on the float 32 cause the float 32 to cover the hole 18b, and thus hydraulic oil from which bubbles have not been removed no longer flows into the inner tube 11.

Third Embodiment

While the outer peripheral surface of the outer tube 13 is covered using the outer peripheral portion 17*a* formed on the plate 17 in the first and second embodiments of the present invention, the outer peripheral surface of the first filtration portion 14 is covered in a third embodiment of the present invention. A suction strainer 3 according to the third embodiment will be described below. Note that the same components as those in the first embodiment are denoted by the same reference numerals, and descriptions thereof will be omitted.

Figure 7:
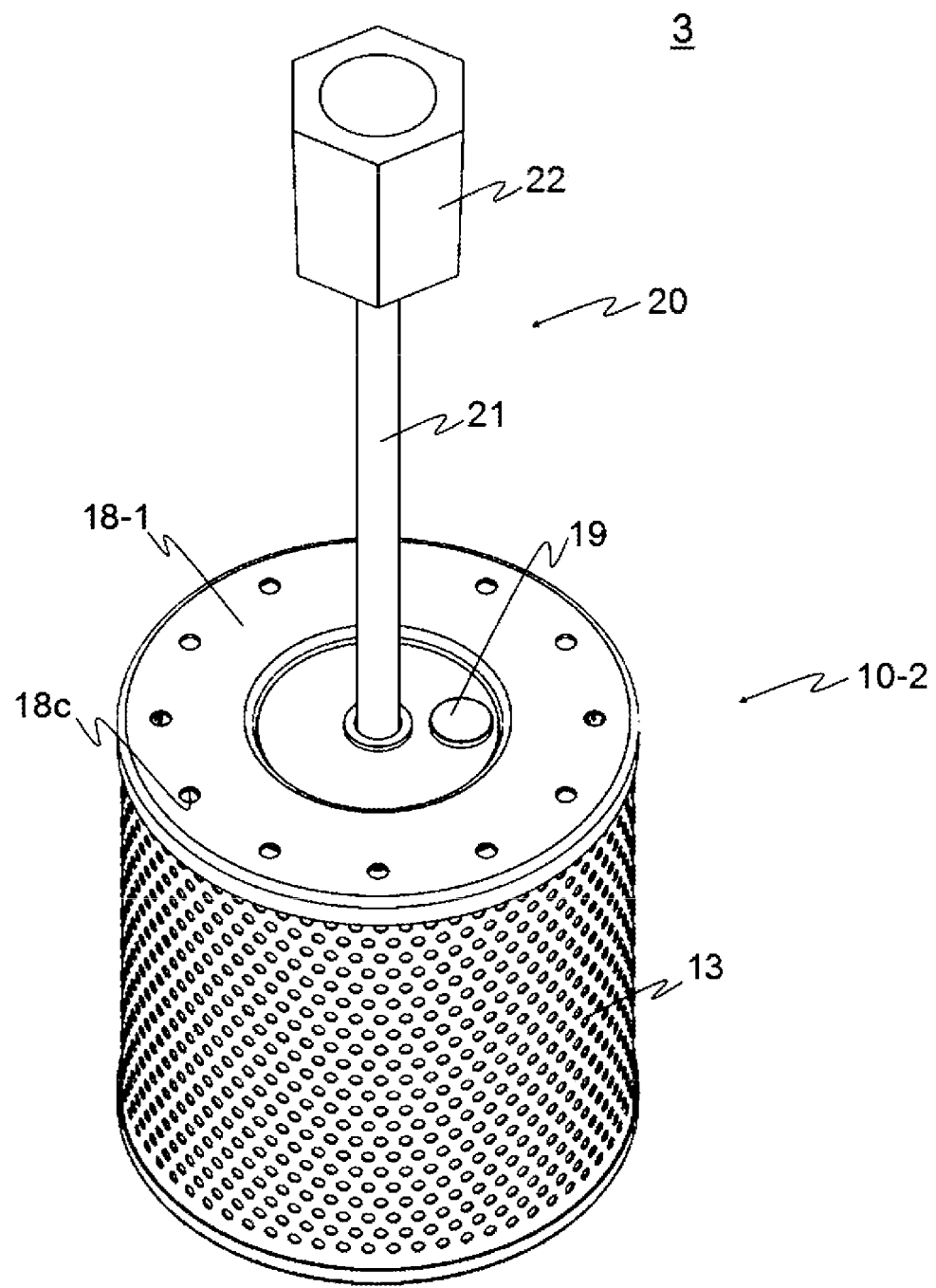
FIG. 7 is a perspective view illustrating an overview of a suction strainer 3.

FIG. 7 is a perspective view illustrating an overview of the suction strainer 3. The suction strainer 3 primarily includes the strainer portion 10-2, and the rod portion 20 connected to the strainer portion 10-2.

Figure 8:
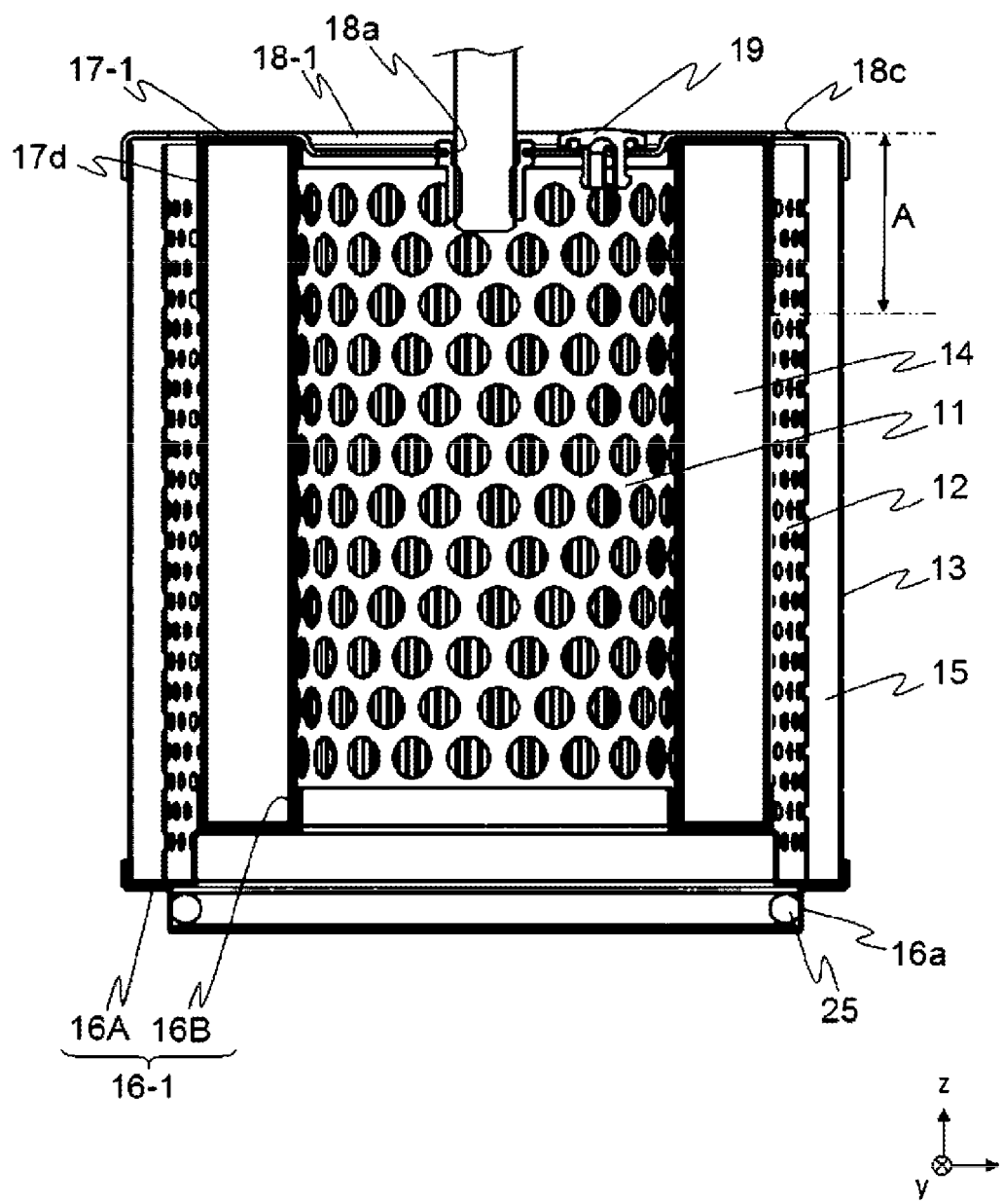
FIG. 8 is a cross-sectional view illustrating the details of a strainer portion 10-2.

FIG. 8 is a cross-sectional view illustrating the details of the strainer portion 10-2 (note that hatching indicating a cross section is omitted). The strainer portion 10-1 primarily includes the inner tube 11, the middle tube 12, the outer tube 13, the first filtration portion 14, the second filtration portion 15, plates 16-1, 17-1, 18-1, and the float 19.

The plate 16-1 is provided to first ends of the inner tube 11, the middle tube 12, the outer tube 13, and the like, and the plate 17-1 and the plate 18-1 are provided to second ends. In other words, the plate 16-1, the plate 17-1, and the plate 18-1 sandwich the inner tube 11, the middle tube 12, the outer tube 13, the first filtration portion 14, and the second filtration portion 15.

The plate 16-1, the plate 17-1, and the plate 18-1 are members having a substantially circular plate shape or a bottomed substantially cylindrical shape, and are formed of resin or metal.

The plate 16-1 primarily includes a plate 16A and a plate 16B.

The plate 16A covers a lower end surface of the second filtration portion 15 as well as the plate 16B that covers a lower end surface of the first filtration portion 14. The plate 16B is integrated with the plate 16A. Further, the fitting portion 16*a* having a cylindrical shape and externally fitted to the outflow port 101*d* is formed on the plate 16A.

The plate 17-1 covers an upper end surface of the first filtration portion 14. The plate 17-1 includes a tubular portion 17*d* having a substantially cylindrical shape. The tubular portion 17*d* covers the region A in the vicinity of the upper end (the end on the +z side) of the first filtration portion 14. Note that no hole is formed in tubular portion 17*d*.

The plate 18-1 is provided to the plate 17-1. The plate 17-1 and the plate 18-1 are integrated by welding or the like. The hole 18*a* is formed in a center portion of the plate 18-1, and the rod 21 is fixed to the plate 18 via the hole 18*a*. Further, the float 19 is provided to the plate 18.

An air hole 18*c* is formed in the plate 18-1 between a portion that comes into contact with the first filtration portion 14 and a second portion that comes into contact with the second filtration portion 15. The air hole 18*c* is a hole for discharging the air accumulated in the vicinity of the upper end of the space formed between the first filtration portion 14 and the middle tube 12 outside the strainer portion 10. A plurality of the air holes 18*c* are formed in a circumferential direction. The number of the air holes 18*c* is not limited to the number (12) illustrated in FIG. 7, and is suitably increased, to the extent possible, to facilitate air discharge.

The size of the air hole 18*c* is greater than the size of the holes of the first filtration portion 14. Further, the size of the air hole 18*c* is substantially the same as the size of the holes formed in the outer tube 13.

Next, the action of the suction strainer 3 will be described. Of the action of the suction strainer 3, the same portions as those of the suction strainer 1 will be not be described below.

In a case that the hydraulic oil stored in the tank main body 101 is suctioned into the hydraulic pump (not illustrated), the hydraulic oil is drawn from the outer side of the outer tube 13 into the strainer portion 10 of the suction strainer 1.

With the plurality of fine spaces formed in the surface and interior of the second filtration portion 15, the bubbles contained in the hydraulic oil are captured in the spaces in the surface and interior of the second filtration portion 15. As a result, the bubbles become larger in the spaces in the surface and interior of the second filtration portion 15, and the large bubbles rise upward (in the +z direction) away from the second filtration portion 15.

A portion of the bubbles that have grown in the second filtration portion 15 are released into the space formed between the first filtration portion 14 and the middle tube 12 via the middle tube 12. The bubbles released into the space formed between this first filtration portion 14 and the middle tube 12 are released outside the strainer portion 10 via the air hole 18*c*.

The vicinity of the upper end of the first filtration portion 14 is covered by the tubular portion 17*d*. This configuration makes it possible to prevent the air accumulated in the space formed between the first filtration portion 14 and the middle tube 12 from being drawn into the first filtration portion 14.

Further, with the tubular portion 17*d* provided, the air released into the space formed between the first filtration portion 14 and the middle tube 12 accumulates in the space formed between the first filtration portion 14 and the middle tube 12 until release from the air hole 18*c*. As a result, the bubbles accumulated in the space formed between the first filtration portion 14 and the middle tube 12 increase in size in this space, allowing the bubbles to be easily released from the air hole 18*c*.

Further, with the vicinity of the upper end of the first filtration portion 14 covered by the tubular portion 17*d*, even in a case that the hydraulic oil tank 100 is tilted and an area in the vicinity of the upper end of the outer tube 13 is exposed to air, it is possible to prevent the air from being drawn into the first filtration portion 14.

Fourth Embodiment

In a fourth embodiment of the present invention, a configuration for opening and closing the hole 18*b* using a ball-type float is employed, similar to the second embodiment. Below, description is given of a suction strainer 4 according to the fourth embodiment. Note that the same components as those in the first to third embodiments are denoted by the same reference numerals, and descriptions thereof will be omitted.

Figure 9:
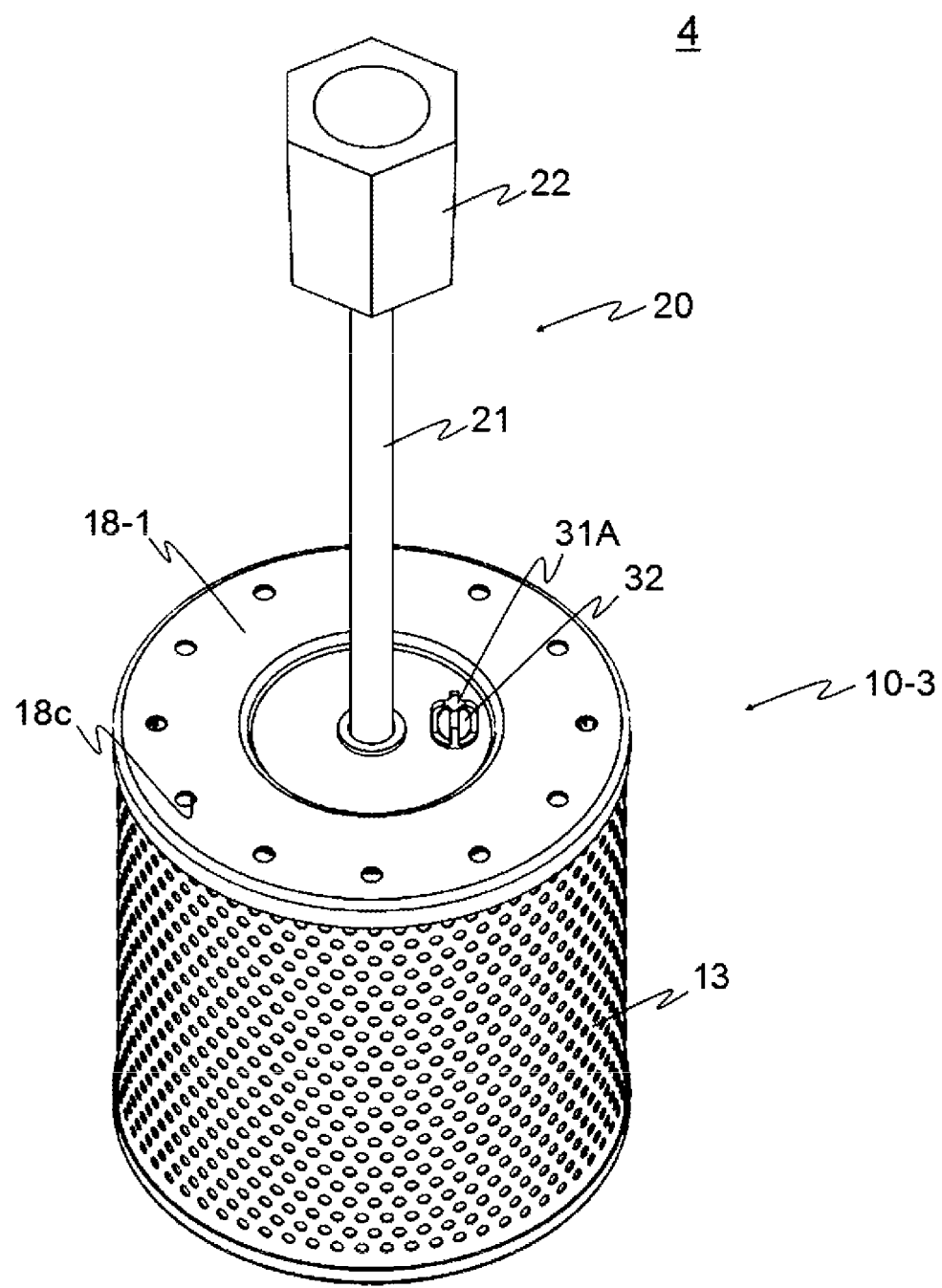
FIG. 9 is a perspective view illustrating an overview of a suction strainer 4.

FIG. 9 is a perspective view illustrating an overview of the suction strainer 4. The suction strainer 4 primarily includes a strainer portion 10-3, and the rod portion 20 connected to the strainer portion 10-3.

Figure 10:
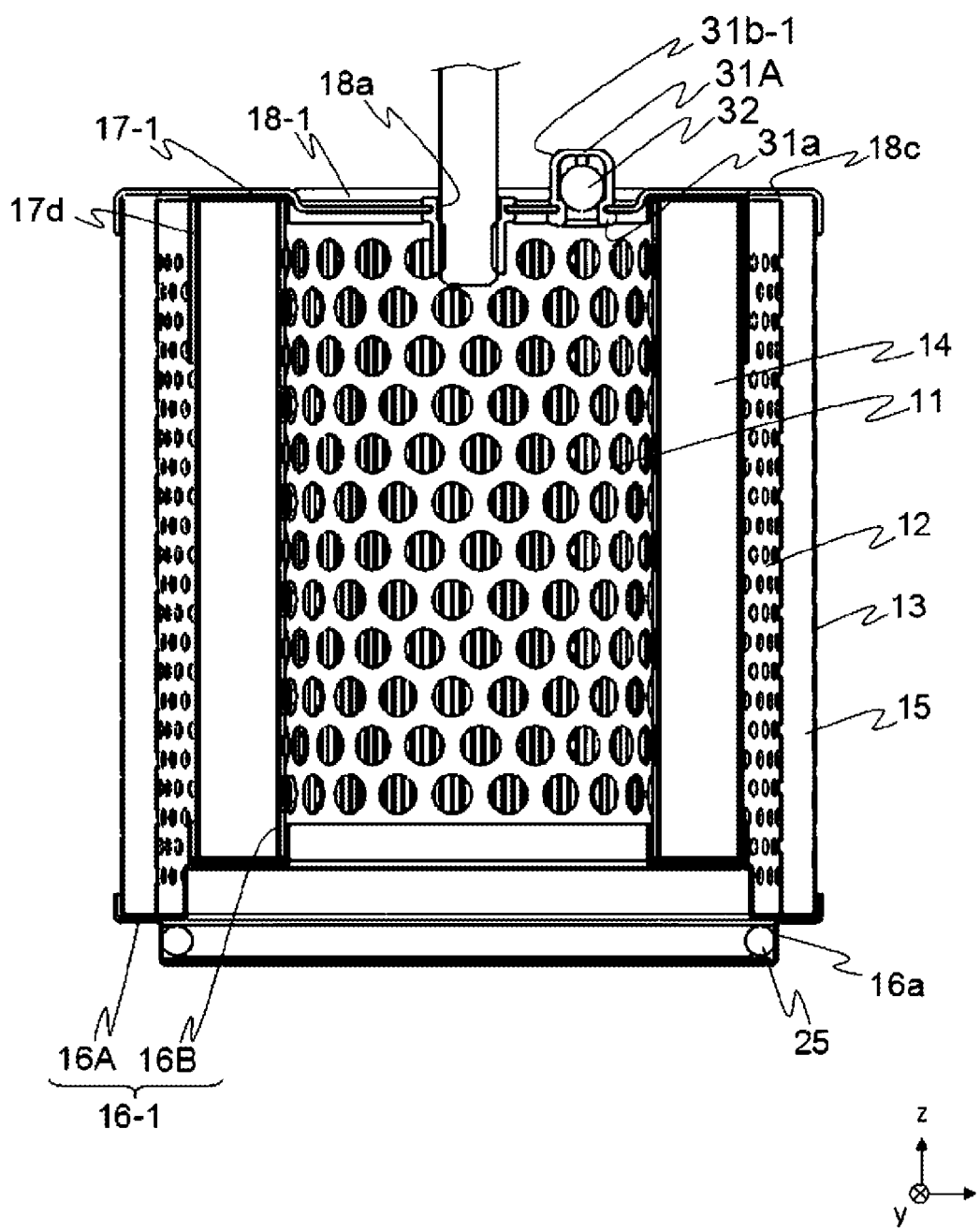
FIG. 10 is a cross-sectional view illustrating the details of a strainer portion 10-3.

FIG. 10 is a cross-sectional view illustrating the details of the strainer portion 10-3 (note that hatching indicating a cross section is omitted). The strainer portion 10-3 primarily includes the inner tube 11, the middle tube 12, the outer tube 13, the first filtration portion 14, the second filtration portion 15, the plates 16-1, 17-1, 18-1, the frame 31A, and the float 32.

The frame 31A is formed of resin, for example. The frame 31A primarily includes the base 31a and an enclosing portion 31b-1. The difference between the frame 31 and the frame 31A is only the number of ribs of the enclosing portion 31b-1. All other details are the same.

Embodiments of the invention have been described in detail with reference to the drawings; however, specific configurations are not limited to the embodiments, and changes in the design or the like are also included within a scope which does not depart from the gist of the invention. For example, the above examples have been explained in detail in order to facilitate understanding of the present invention and are not necessarily limited to examples provided with the entirety of the configuration described above. In addition, the configuration of an embodiment may be partially replaced with the configuration of a different embodiment, or the configuration of the different embodiment may be added to, deleted from, or replaced with the configuration of the embodiment.

Further, the term "substantially" in the present invention is not to be understood as merely being strictly the same, and is a concept that includes variations and modifications to an extent that does not result in loss in identity. For example, the term "substantially orthogonal" is not limited to being strictly orthogonal, and is a concept that includes variations of several degrees, for example. Further, simple expressions such as orthogonal, parallel, and matching are not to be understood as merely being strictly orthogonal, parallel, matching, and the like, and include being substantially parallel, substantially orthogonal, substantially matching, and the like.

Furthermore, the meaning of the term "vicinity" in the present invention includes a region of a range (which can be determined as desired) near a position serving as a reference. For example, the term "a vicinity of an end" refers to a region of a range near the end, and is a concept indicating that the end may or may not be included.

REFERENCE SIGNS LIST 1, 2, 3, 4 Suction strainer
10, 10-1, 10-2, 10-3 Strainer portion
11 Inner tube
12 Middle tube
13 Outer tube
14 First filtration portion
15 Second filtration portion
16, 16-1 Plate
16A Plate
16B Plate
16a Fitting portion
17, 17-1 Plate
17a Outer peripheral portion
17b Air hole
17c Air hole
17d Tubular portion
18, 18-1 Plate
18a Hole
18b Hole
18c Air hole
19 Float
19a Main body portion
19b Stopper
20 Rod portion
21 Rod
22 Attaching portion
23 Spring
25 Sealing member
31, 31A Frame
31b, 31b-1 Enclosing portion
32 Float
100 Hydraulic oil tank
101 Tank main body
101a Inflow port
101b Opening
101c Opening
101d Outflow port
101e Partition plate
102, 103 Lid
104 Suction pipe
105 Bolt
110 Return filter

The invention claimed is:

1. A suction strainer provided in a tank configured to store oil, the suction strainer comprising:
 a first filtration portion having a substantially cylindrical shape and formed from a pleated thin plate;
 a second filtration portion formed from a bundle of metal fibers, the second filtration portion having a substantially cylindrical shape and provided to an outer side of the first filtration portion, the second filtration portion being formed of a material having a plurality of spaces formed in a surface and interior of the material;
 a middle tube disposed to partition between an outer circumferential surface of the first filtration portion and an inner circumferential surface of the second filtration portion, wherein middle tube holes are distributed over an entire surface of the middle tube;
 an inner tube that is accommodated inside the second filtration portion, wherein inner tube holes are distributed over an entire surface of the inner tube;
 an outer tube that accommodates the first filtration portion, wherein outer tube holes are distributed over an entire surface of the outer tube,
 wherein:
 a total area of the inner tube holes distributed over the entire surface of the inner tube is larger than a total area of the middle tube holes distributed over the entire surface of the middle tube;
 the diameter of each of the inner tube holes is larger than a diameter of each of the middle tube holes;
 the total area of the inner holes distributed over the entire surface of the inner tube is larger than a total area of the outer tube holes distributed over the entire surface of the outer tube; and
 the diameter of each of the inner tube holes is larger than a diameter of each of the outer tube holes.

2. The suction strainer according to claim 1, further comprising:
 a first plate configured to cover entire upper end surfaces of the first filtration portion and the second filtration portion; and
 a float movable between a first position where the float closes a first hole formed in the first plate and a second position where the float opens the first hole.

3. The suction strainer according to claim 2, wherein the first plate comprises a tubular portion having a substantially cylindrical shape and configured to cover a vicinity of an upper end of an outer peripheral surface of the first filtration portion.

4. The suction strainer according to claim 3, wherein the first plate further comprises a second hole that is formed between a first portion that comes into contact with the first filtration portion and a second portion that comes into contact with the second filtration portion and is larger than a hole formed in the first filtration portion, and wherein the second hole allows air accumulated between the first filtration portion and the second filtration portion to be released outside the strainer.

5. The suction strainer according to claim 3, wherein the float is moved to the first position when a pressure inside the suction strainer is lower than a predetermined value.

6. The suction strainer according to claim 2, further comprising the outer tube portion configured to cover an outer peripheral surface of the second filtration portion, the outer tube portion having holes covered in a first region in a vicinity of an upper end of the outer tube portion and having holes uncovered in an entire surface of a second region other than the first region of the outer tube portion.

7. The suction strainer according to claim 6, wherein the first plate further comprises a second hole that is formed between a first portion that comes into contact with the first filtration portion and a second portion that comes into contact with the second filtration portion and is larger than a hole formed in the first filtration portion, and wherein the second hole allows air accumulated between the first filtration portion and the second filtration portion to be released outside the strainer.

8. The suction strainer according to claim 6, wherein the float is moved to the first position when a pressure inside the suction strainer is lower than a predetermined value.

9. The suction strainer according to claim 2, wherein the first plate further comprises a second hole that is formed between a first portion that comes into contact with the first filtration portion and a second portion that comes into contact with the second filtration portion and is larger than a hole formed in the first filtration portion, and wherein the second hole allows air accumulated between the first filtration portion and the second filtration portion to be released outside the strainer.

10. The suction strainer according to claim 9, wherein the float is moved to the first position when a pressure inside the suction strainer is lower than a predetermined value.

11. The suction strainer according to claim 2, wherein the float is moved to the first position when a pressure inside the suction strainer is lower than a predetermined value.

12. The suction strainer according to claim 1, further comprising the outer tube portion configured to cover an outer peripheral surface of the second filtration portion, the outer tube portion having holes covered in a first region in a vicinity of an upper end of the outer tube portion and having holes uncovered in an entire surface of a second region other than the first region of the outer tube portion.

13. The suction strainer according to claim 12, further comprising:

a first plate configured to cover entire upper end surfaces of the first filtration portion and the second filtration portion, wherein the first plate further comprises an air release hole that is formed between a first portion that comes into contact with the first filtration portion and a second portion that comes into contact with the second filtration portion and is larger than a hole formed in the first filtration portion, and wherein the air release hole allows air accumulated between the first filtration portion and the second filtration portion to be released outside the strainer.

14. The suction strainer according to claim 1, further comprising:

a first plate configured to cover entire upper end surfaces of the first filtration portion and the second filtration portion, wherein the first plate further comprises an air release hole that is formed between a first portion that comes into contact with the first filtration portion and a second portion that comes into contact with the second filtration portion and is larger than a hole formed in the first filtration portion, and wherein the air release hole allows air accumulated between the first filtration portion and the second filtration portion to be released outside the strainer.

15. The suction strainer according to claim 1, wherein the first filtration portion has a thickness in a radial direction and an outer diameter of the first filtration is smaller than an inner diameter of the middle tube.

* * * * *